United States Patent Office 3,280,138
Patented Oct. 18, 1966

3,280,138
CARBAMATES OF BENZOTRIAZOLES
Istvan Molnar and Theodor Wagner-Jauregg, Zofingen, and Otto Buch, Basel-Riehen, Switzerland, assignors to Siegfried Aktiengesellschaft, Zofingen, Switzerland, a corporation of Switzerland
No Drawing. Filed Feb. 5, 1962, Ser. No. 171,282
6 Claims. (Cl. 260—308)

This invention relates to new carbamates of benzotriazoles of the general formula

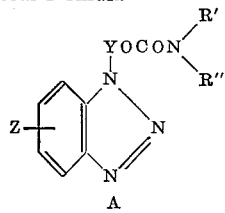

A and

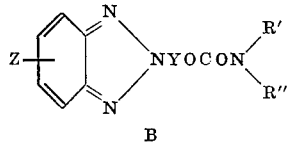

B wherein R' and R" are H-atoms or lower alkyl radicals Y stands for a lower alkylene group containing from 1–6 carbon atoms which may or may not have a side chain and wherein Z is H or one or two chlorine atoms in 5 and/or 6 positions.

Substances of the above formula can be prepared by transforming the corresponding hydroxyalkyl benzotriazoles into their carbamates according to methods known in the art. An alternative method of preparing the benzotriazoles substituted in 1-position is illustrated by the following reaction scheme:

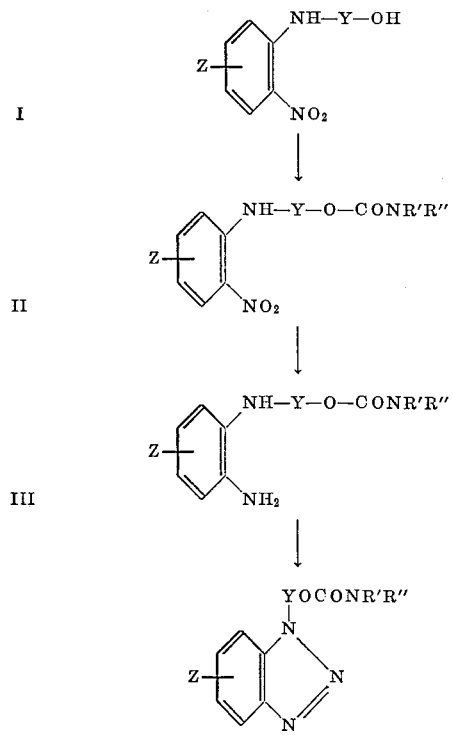

In various pharmacological tests compounds of the formula A and B manifest antiphlogistic, antipyretic, anticonvulsive, sedative or muscle-relaxative properties, combined with a low toxicity. E.g. the carbamate of 1-(2'-hydroxyethyl) benzotriazole is particularly effective in the treatment of inflammations, for instance edemas produced in the paws of rats by introplantaral injections of formaline, dextrane, serotonine, ovalbumine, yeast or kaolin.

The antiinflammatory properties of the carbamate of 1-(2'-hydroxyethyl) benzotriazole, as established in animal experiments in comparison with the well known antirheumatic substance phenylbutazone, point to the utility of the present invention for its application for clinical treatment of allergic and rheumatic diseases. To prove the innocuity of the substance single doses of 50, 100 and 200 mg. have been administered perorally to human volunteers without any feelings of discomfort or detrimental effects. For therapeutic purposes these doses should be administered to the patient 1.4 times per diem, preferably perorally. Also other modes of application, e.g. the rectal one, seen indicated.

In the following examples some suitable methods for the preparation of the claimed compounds are described.

Examples (1) 25 g. of N (2'-hydroxyethyl)-2-nitro-4,5-dichloro aniline (Journ. Am. Chem. Soc. 61, page 2660) are dissolved in 250 ml. of dry dioxane. This solution is reacted with 10 g. of ureachloride, whereupon N (2'-carbamoyloxyethyl)-2-nitro-4,5-dichloro aniline precipitates. After crystallization of the solid from hot dioxane ethylalcohol (1:3) mixture a product with melting point 135° C. is obtained. It is dissolved in 25 times its volume of hot alcohol containing 10% sulfuric acid. After dilution with the same volume of water the product crystallizes with a melting point of 157–158° C.

*Analysis.*—Calcd. for $C_9H_9Cl_2N_3O_4$ (294.1). Cl, 24.10%; Found: 24.20%.

To a solution of 20 g. of N (2'-carbamyloxyethyl)-2-nitro-4,5-dichloro aniline in 400 ml. of glacial acetic acid, palladium on carbon is added and vigorously shaken (20° C.) until the calcd. amount of hydrogen is absorbed. The reaction mixture is filtered and subsequently neutralized by addition of 1000 ml. of a 25% aqueous ammonia solution. 1(N)-(2'-carbamoyloxyethyl)-2-amino-4,5-dichloro aniline separates as an oil which readily solidifies (M.P. 123–124° C.).

5 g. of this compound are dissolved in 50 ml. of dimethyl formamide and 8 ml of 5 N hydrochloric acid. This solution is cooled to about 0° C. and there is gradually added an aqueous solution (10 ml.) containing 2.5 g. of $NaNO_2$. After adding 150 ml. of water in portions 1(N)-(2'-carbamoyloxyethyl) - 5,6-dichlorobenzotriazole separates in form of colorless crystals, which, after crystallization, have a melting point of 179–181°.

*Analysis.*—$C_9H_8Cl_2N_4D_2$ (275.1). Cl, 25.60; Found: 25.60.

(2) A solution of 244 g. of 1-(2'-hydroxyethyl) benzotriazole (IV) (Ber. Deutsch. Chem. Ges., 71, 600, 1938) in 1600 ml. methylenechloride is added dropwise into 790 gr. of a cooled and vigorously stirred 20% solution of phosgene in methylenechloride, the temperature being maintained below 4° C. During this operation the chloroformic acid ester separates as a fine suspension. To finish the reaction stirring is continued during the night without external cooling.

The chloroformate of I is transformed into the carbamic acid ester by adding the stirred methylene chloride suspension in small portions into 2.5 liter cooled 25% aqueous ammonia. The carbamic acid ester (V) separates in light yellow coloured crystals when stirring the mixture during 7 hours at 20° C. The filtered substance, after one recrystallization from ethanol is colorless and melts at 122–123° C. A further crop can be obtained after evaporation of the methylene chloride. Yield: 90%.

(3) 1-(2'-hydroxyethyl) benzotriazole (1) is reacted with phenylchloroformate according to known methods. The phenyl carbonic acid ester of the above hydroxyethyl benzotriazole has a M.P. 83–85.5° and is subsequently treated with a saturated solution of ammonia in alcohol. This 1-(2'-carbamoyloxyethyl)-benzotriazole (II) is obtained. Yield: 85%.

M.P. 122–123° (Crystallized from an alcohol petrol-ether mixture).

*Analysis.*—$C_9H_{10}O_2N_4$ (206.2). C, 52.40; H, 4.89. Found: C, 52.20; H, 4.90.

Working in a like manner with 1-(2'- or 3'-hydroxypropyl)-benzotriazole as starting materials the corresponding 1-(2'- and 3'-carbamoyloxypropyl)-benzotriazoles are obtained. M.P. 126–127° C. and 125–126° C. respectively.

In an analogous manner 2-(2'-carbamoyloxyethyl)-benzotriazole (M.P. 134–135° C.), 2-(3'-carbamoyloxypropyl)-benzotriazole (M.P. 114–116° C.) and 1-(2'-carbamoyloxyethyl)-6-chlorobenzotriazole (M.P. 176.5–178° C.) are obtained.

What we claim is:

1. A compound selected from the group consisting of compounds having the formula

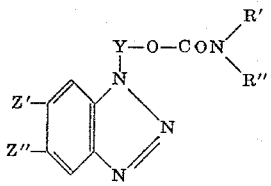

and compounds having the formula

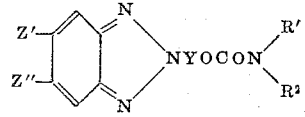

wherein R' and R" are selected from the group consisting of hydrogen and lower alkyl radicals, Y is a lower alkylene group containing from one to six carbon atoms, and Z' and Z" are selected from the group consisting of hydrogen and chlorine.

2. A compound according to claim 1, wherein the alkylene group is ethylene and R' and R" are hydrogen.

3. The compound 1(N)-(2'-carbamoylhydroxyethyl)-5,6-dichlorobenzotriazole.

4. The compound 1-(2'-carbamoylhydroxyethyl)-benzotriazole.

5. The compound 1-(2'-carbamoylhydroxypropyl)-benzotriazole.

6. The compound 1-(3'-carbamoylhydroxypropyl)-benzotriazole.

References Cited by the Examiner

UNITED STATES PATENTS

| | | | |
|---|---|---|---|
| 2,501,649 | 3/1950 | Wright | 260—308 |
| 2,700,669 | 1/1955 | Scalera | 260—308.1 |
| 2,806,035 | 9/1957 | Margot | 260—308.1 |
| 3,214,337 | 10/1965 | Couturier | 167—65 |
| 3,224,942 | 12/1965 | Martin | 167—65 |

ALEX MAZEL, *Primary Examiner.*

FRANK CACCIAPAGLIA, JULIAN S. LEVITT,
*Examiners.*

L. B. RANDALL, R. J. GALLAGHER,
*Assistant Examiners.*